*INVENTORS*
RICHARD THOMAS WHALEN
RALPH GREGORY D'ASCOLI
BY

ATTORNEYS

United States Patent Office 2,885,737
Patented May 12, 1959

2,885,737

MANUFACTURE OF HIGH FREQUENCY CABLE

Richard Thomas Whalen, Bronx, and Ralph Gregory D'Ascoli, Yonkers, N.Y., assignors to Anaconda Wire and Cable Company, a corporation of Delaware Application May 24, 1954, Serial No. 431,914

4 Claims. (Cl. 18—59)

This invention relates to the manufacture of cables for use at high frequencies, especially in the very high and ultra-high frequency ranges extending from 30 to 3000 megacycles. The invention is particularly directed to the manufacture of cables insulated with porous cellular polyethylene, and provides an improved method for applying cellular polyethylene insulation to wires and cables by extrusion.

Electric wires and cables which are insulated with dense solid polyethylene normally have the polyethylene insulation applied by extrusion. However, the application of a layer of cellular polyethylene insulation to a wire or cable by an extrusion operation presents a number of difficult problems not encountered in ordinary extrusion operations. These difficulties result from the fact that cellular polyethylene is formed by incorporating a blowing agent in the polyethylene composition, and then heating it to a temperature high enough to cause the blowing agent to decompose. Gas evolved upon decomposition of the blowing agent expands the polyethylene into a porous cellular structure. Since the extrusion operation requires heating the polyethylene composition to a high temperature and forcing it under high pressure through an extrusion die, it is evident that cellular polyethylene as such cannot be extruded. The insulation layer about the wire or cable must be extruded in a substantially non-porous form, and must thereafter be expanded into a cellular structure.

Heretofore it has been considered necessary to avoid heating the mixture of polyethylene and blowing agent, either prior to or during the extrusion operation, to a temperature above the decomposition temperature of the blowing agent, in order to avoid premature expansion of the composition and breakdown of the expanded structure as it is forced through the extrusion die. The extrusion operation, therefore, has been carried out by carefully limiting heating of the polyethylene composition, preparatory to and during extrusion, to a temperature below the decomposition temperature of the blowing agent. Heating the extruded polyethylene to a temperature high enough to decompose the blowing agent and expand the polyethylene into a porous cellular structure then has been effected in a separate step subsequent to completion of the extrusion operation.

The present invention provides an improved method for extruding a mixture of polyethylene and a blowing agent to form a porous cellular layer of polyethylene about a wire, which involves heating the polyethylene during extrusion to a temperature substantially above the decomposition temperature of the blowing agent, and which does not require heating the extruded product in a second separate operation in order to expand it. The extrusion operation is consequently greatly facilitated, because in the first place it is carried out at a temperature approximating the normal extrusion temperature for polyethylene, and in the second place the separate step of heating the extruded layer on the wire to expand it into a cellular structure is eliminated.

In carrying out the new method, a mixture of polyethylene and a blowing agent is heated to a temperature at which the polyethylene flows readily under pressure, said elevated temperature being above the temperature at which the blowing agent decomposes. The mixture, however, is maintained at a pressure high enough to prevent expansion of the polyethylene while it is heated to said elevated temperature. The hot mixture then is extruded about a wire at ordinary atmospheric pressure, and thereupon the gas evolved by decomposition of the blowing agent is enabled to expand the polyethylene into cellular form. The freshly extruded mixture is maintained out of contact with external supports until expansion thereof is completed, and until the polyethylene itself has cooled to a temperature at which it is resistant to deformation when subjected to pressure.

In order to assure maintaining the polyethylene under adequate pressure preparatory to extruding it, the mixture of polyethylene and blowing agent is cooled immediately prior to extrusion to a temperature somewhat below the maximum temperature to which it is heated. Thereby the pressure required for extrusion is increased, and the heated mixture is maintained under a pressure high enough to inhibit any substantial expansion of the polyethylene prior to extrusion.

A preferred embodiment of the invention is described below with particular reference to the accompanying drawing, in which Fig. 1 is a plan, partly in cross section, of apparatus suitable for carrying out the method of the invention;

Figure 1:
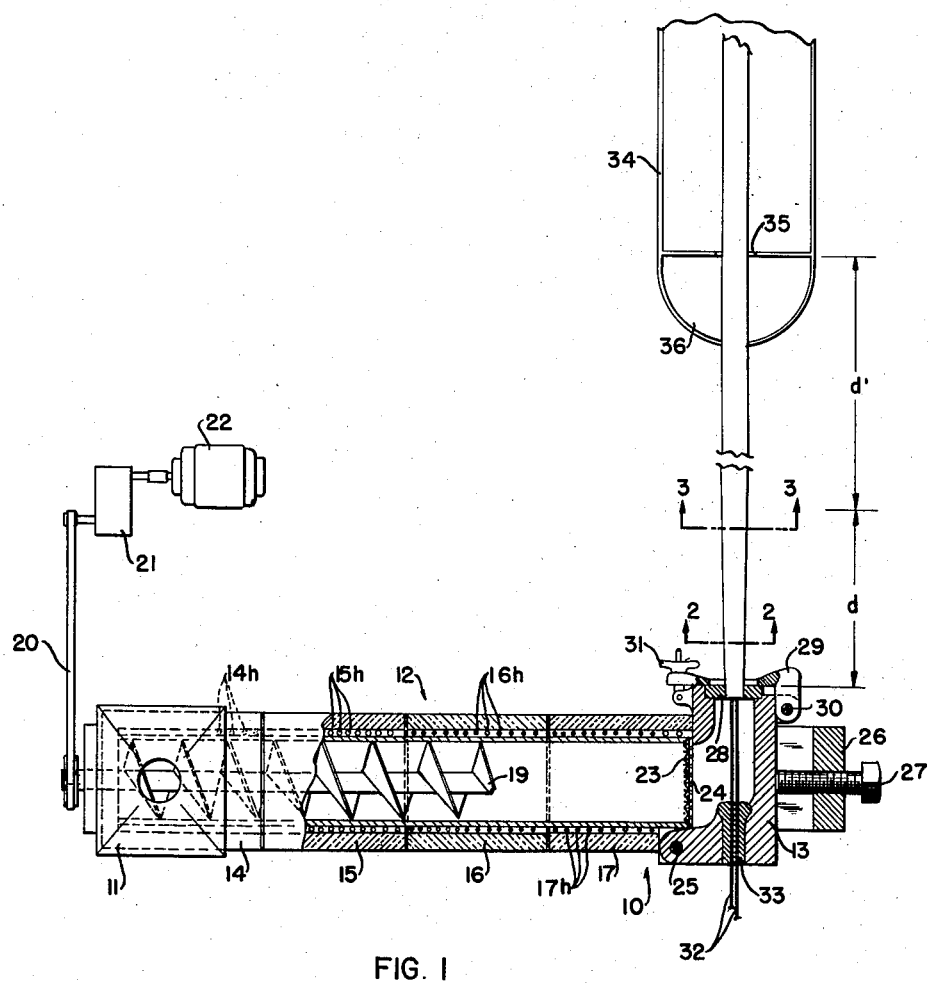

The apparatus shown in Fig. 1 comprises a more or less conventional extrusion machine 10. A mixture of polyethylene and blowing agent is fed into the machine through a feed hopper 11, from which it is passed through a heating and mixing chamber 12 to an extrusion head 13. The chamber 12 is divided into four heating zones 14, 15, 16 and 17, and each zone is provided with a separately controlled electric heating element 14h, 15h, 16h and 17h. Pressure is applied to the mixture of polyethylene and blowing agent entering through the feed hopper 11 by means of a feed screw 19. The feed screw shaft is connected by a belt 20 to a reduction gear box 21, through which it is driven by a motor 22. A screen pack 23, composed of several fine mesh screens supported by a perforated breaker plate 24, is mounted at the discharge end of the chamber 12 where the mixture of polyethylene and blowing agent flows into the extrusion head 13.

The extrusion head 13 is hingedly mounted on a pivot pin 25, and is held against the discharge end of the chamber 12 by a clamp bracket 26 and clamp screw 27. An extrusion die 28 is clamped to the discharge end of the extrusion head by means of a bracket 29, which is hingedly mounted on a pin 30 and releasably clamped against the die by a clamp screw nut 31. A pair of wires 32 to be insulated enters the extrusion head 13 through suitably spaced holes in a guider die 33 at the rear of the extrusion head, and emerges from the extrusion head through the opening in the extrusion die 28.

In carrying out the method of the invention, a mixture of polyethylene and blowing agent is fed into the extrusion apparatus through the feed hopper 11. The mixture may be prepared in any convenient manner and in any conventional mixing apparatus. A satisfactory manner of preparing it is to tumble granular or flake polyethylene with the desired proportion of granular or powdered blowing agent in a mixing barrel. Coloring pigments may be incorporated in the mixture at the same time, if desired.

The tumbled mixture may advantageously be kneaded on mixing rolls into worked strips of convenient size for handling and feeding into the feed hopper 11.

Any blowing agent of the character used for making cellular rubber or plastic articles may be used in preparing the mixture. However, especially satisfactory results are obtained using nitrogen blowing agents. One such agent which has given very satisfactory results is p,p' oxy bis (benzeen sulfonyl hydrazide) which is sold under the trade name "Celogen" by the Naugatuck Chemical Division of the United States Rubber Company. Other nitrogen blowing agents which can be used with advantage are diazoaminobenzene and dinitroso pentamethylenetetramine. Nitrogen blowing agents such as those just mentioned are preferred because they are especially satisfactory for forming a cellular polyethylene structure in which the individual pores are all isolated from each other by substantially impervious walls of polyethylene, as distinguished from a spongy structure in which the individual pores are in substantially free communication with one another and with the outer surface of the structure. So far as the method of this invention is concerned, however, other blowing agents can be used with success. For example, ammonia blowing agents such as urea or biuret, or carbon dioxide blowing agents such as ammonium carbonate, and mixtures of these various types of blowing agents, all can be used.

The amount of blowing agent employed in preparing the mixture is determined by the extent to which it is desired to expand the polyethylene. In the manufacture of wires and cables for high frequency use, expansion to a bulk density not exceeding about 65% of the density of solid polyethylene (solid polyethylene has a density of about 0.92), and even as little as 35% of the density of solid polyethylene, generally is desired. For this degree of expansion only a relatively small amount of blowing agent is required, say ¼% to generally not more than about 1% by weight of the polyethylene mixture. Only in rare instances will the amount of blowing agent equal or exceed 2% by weight of the mixture.

An example of a polyethylene composition which has been used with considerable success is one consisting essentially of 0.75% "Celogen," 0.6% coloring pigments, and the balance polyethylene.

The power supplied to the heating elements in each of the sections 14, 15, 16 and 17 of the mixing and heating chamber 12 is regulated so that the temperature of the polyethylene composition is gradually brought to a value high enough for the polyethylene to flow readily under the pressure exerted by the feed screw 19. For this purpose, the polyethylene should be brought to a temperature of about 350° F. by the time it reaches the screen pack 23. At this temperature the polyethylene composition flows quite readily through the screen pack. Forcing the composition at this elevated temperature through the screen pack insures intimate blending and mixing of the blowing agent, the pigments, and the polyethylene, and also insures breaking up of any lumps that have not previously been eliminated.

By way of example, an advantageous temperature gradient through the heating and mixing chamber 12 is established by regulating the power supply to the heating elements 14h, 15h, etc., in each of the sections 14, 15, 16 and 17 so that the polyethylene in the first section 14 is brought to a temperature of about 260° F., then is further heated in the second section 15 to a temperature of about 275° F., then is brought in the third section 16 to a temperature of about 340° F., and finally is heated in the last section 17 to the temperature of about 350° F.

"Celogen" and other blowing agents decompose with the evolution of considerable nitrogen or other gas at temperatures considerably below 350° F. (e.g. at about 300° to 325° F.). However, if the polyethylene composition is allowed to expand to any substantial extent by decomposition of the blowing agent in the extrusion apparatus, the resulting expanded structure is broken down by the extrusion operation, and the surface quality of the extruded product as it emerges from the extrusion die is very poor. It is therefore necessary to prevent expansion of the polyethylene composition in the extrusion apparatus. This is accomplished by maintaining the composition under a sufficiently high pressure so as to prevent expansion of the polyethylene prior to its emergence from the extrusion die. To this end, the polyethylene composition is cooled upon entering the extrusion head 13 to a temperature substantially below 350° F., and advantageously to about 325° F., by maintaining the extrusion head itself at a suitably low temperature (preferably about 290° F. in the case where the temperature gradient through the heating and mixing chamber 12 is in accordance with the example given above, and where the polyethylene composition contains "Celogen" as the blowing agent). This cooling of the polyethylene decreases its flowability and, consequently, its resistance to extrusion, with the result that a sufficiently high pressure is created. Temperature control means, such as heating elements or cooling coils, can be applied to the extrusion head, if desired, to control its temperature. However, we have found that under normal extrusion conditions, an adequate degree of cooling of the extrusion head results from normal radiation losses if no provision is made for heating the head. Accordingly, no special means are shown in the drawing for either heating or cooling the extrusion head 13.

The reduced temperature of the polyethylene in the extrusion head, and especially at and near the opening in the die 28, results in a substantial increase in the pressure required to extrude it through the die opening. The relatively high extrusion pressure thus caused reacts against the mass of polyethylene heated to the maximum temperature adjacent the screen pack 23 in the last section 17 of the heating and mixing chamber. Thereby, expansion of the polyethylene in the extrusion apparatus is for the most part prevented.

As the polyethylene composition emerges through the extrusion die 28, the pressure acting on it is suddenly reduced to atmospheric. The composition, however, is still at a temperature a little above the temperature at which the blowing agent decomposes, and expansion of the extruded polyethylene begins to take place at once. Expansion proceeds rapidly, and is substantially complete within three to five seconds. At an extrusion speed of 60 to 75 feet per minute, the distance $d$ (Fig. 1) which the fresh extrusion traverses while expansion is taking place is about three to six feet.

The freshly extruded material is still hot, soft and readily deformed at the end of the time required for the wire to travel the distance $d$. Additional time must be allowed for the polyethylene composition to cool to a temperature at which it resists deformation when subjected to mechanical force, before it can be given any mechanical support. In the manufacture of a typical television lead-in cable, for example, about eight to ten seconds is required for the freshly expanded polyethylene to cool sufficiently (e.g. to about 150° F.) for handling in a water trough. At the above indicated extrusion speed of 60 to 75 feet per minute, a distance $d'$ of about six to twelve feet additional to the distance $d$ must be provided for cooling the fresh extrusion, before the extruded polyethylene is brought into a water trough 34 and into direct contact therein with flowing cold water. The trough 34 is long enough to cool the expanded polyethylene substantially to room temperature. The cold water flows through the trough in a direction countercurrent to the direction of movement of the cable and flows out of the trough through the same opening 35 through which the cable enters. The outflowing water runs into a collecting funnel 36, from which it is either recirculated or discharged to the sewer.

Figure 2:
Fig. 2 is a section taken substantially along the line 2—2 of Fig. 1.
Figure 3:
Fig. 3 is a section taken substantially along the line 3—3 of Fig. 1.

Figs. 2 and 3 illustrate the expansion of the polyethylene which takes place upon its emergence from the extrusion die 28. Fig. 2 is a cross section through a typical 2-conductor television lead-in cable, taken substantially along the line 2—2 of Fig. 1 closely adjacent the exit side of the extrusion die 28. At this point, the extruded polyethylene composition is substantially non-porous. However, expansion of the polyethylene has already begun, and within a few seconds the cross section of the cable will have expanded substantially in the proportion indicated by the relatively greater size of the cross section of Fig. 3, which section is taken substantially along the line 3—3 of Fig. 1, about at the point where expansion is complete. The polyethylene insulation at this point is of porous cellular structure and its bulk density is only about 50% to 55% of that of solid non-porous polyethylene. As indicated in Figs. 2 and 3, expansion of the polyethylene proceeds uniformly through the entire cross section of the extrusion, and even the spacing between the conductors 32 is increased in proportion to the linear increase in cross-sectional dimensions of the polyethylene extrusion.

Although the accompanying drawings particularly illustrate the manufacture of a 2-conductor cable having an extruded insulation of oval cross section, it is evident that the method of the invention can be used equally well to produce cables of other types. For example, a single conductor may be surrounded by an extruded layer of polyethylene, circular in cross section, by the method of the invention, and the resulting product may then be surrounded by a braid to form a flexible coaxial cable.

We claim:

1. In the method of forming an insulated layer of cellular polyethylene about a wire in which a confined mixture of polyethylene and a blowing agent is heated to an elevated temperature at which the polyethylene flows readily under pressure and the blowing agent substantially completely decomposes, the mixture is maintained under pressure sufficient to prevent substantial expansion thereof as a result of the decomposition of the blowing agent and the mixture is extruded about a wire and then permitted to expand; the improvement in which the mixture is maintained under said pressure, in part, by cooling the portion thereof about to be extruded prior to its extrusion to reduce its flowability and to increase its resistance to extrusion sufficiently to build up the necessary back pressure.

2. The method of claim 1 in which the blowing agent has a decomposition temperature of about 325° F., the confined mixture is heated to about 350° F. and then cooled to below 325° F. prior to extrusion.

3. The method of claim 2 in which the blowing agent is one containing nitrogen.

4. The method of claim 1 in which the mixture of polyethylene and decomposed blowing agent is extruded about the wire while the wire is disposed in the open atmosphere.

References Cited in the file of this patent

UNITED STATES PATENTS

| | | |
|---|---|---|
| 1,370,800 | Egerton | Mar. 8, 1921 |
| 1,455,946 | Wester | May 22, 1923 |
| 2,256,483 | Johnston | Sept. 23, 1941 |
| 2,358,963 | Davies | Sept. 26, 1944 |
| 2,508,988 | Bradley | May 23, 1950 |
| 2,736,064 | Rubin | Feb. 28, 1956 |
| 2,766,481 | Henning | Oct. 16, 1956 |

FOREIGN PATENTS

| | | |
|---|---|---|
| 629,668 | Great Britain | Sept. 26, 1949 |